United States Patent [19]

Nagata

[11] Patent Number: 5,443,859
[45] Date of Patent: Aug. 22, 1995

[54] CARBON FILM AND PROCESS FOR PREPARING THE SAME

[75] Inventor: Yasuhisa Nagata, Shizuoka, Japan

[73] Assignee: Toho Rayon Co., Ltd., Tokyo, Japan

[21] Appl. No.: 248,690

[22] Filed: May 25, 1994

Related U.S. Application Data

[62] Division of Ser. No. 890,155, May 29, 1992, Pat. No. 5,352,524.

[30] Foreign Application Priority Data

May 31, 1991 [JP] Japan .................. 3-129277
May 15, 1992 [JP] Japan .................. 4-123972

[51] Int. Cl.$^6$ ................ B05D 3/02; C01B 31/00
[52] U.S. Cl. ................... 427/122; 427/228;
427/294; 427/372.2; 427/386; 264/29.6;
428/408
[58] Field of Search ............... 427/122, 228, 294, 386,
427/372.2; 264/29.6; 428/408

[56] References Cited

U.S. PATENT DOCUMENTS

| | | | |
|---|---|---|---|
| 4,597,844 | 7/1987 | Hiraki et al. | 428/408 |
| 4,701,317 | 10/1987 | Arakawa et al. | 428/408 |
| 4,797,307 | 1/1989 | Kunimoto et al. | 427/386 |
| 4,842,665 | 6/1989 | Taguchi et al. | 428/408 |
| 4,876,077 | 10/1989 | Murakami | 423/448 |
| 4,915,984 | 11/1990 | Murakami | 423/448 |
| 4,996,079 | 2/1991 | Itoh | 427/39 |

FOREIGN PATENT DOCUMENTS 48-39392 6/1973 Japan .

OTHER PUBLICATIONS

H. H. Je et al, "A Study on the Deposition of Pyrolytic Carbons From Hydrocarbons", Carbon, vol. 22, No. 6, pp. 563–570, 1984.

J. L. Kaae, "The Mechanism of the Deposition of Pyrolytic Carbons", Carbon vol. 23, No. 6, pp. 665–673, 1985.

A. Kavanagh et al, "The Morphology of Some Natural and Synthetic Graphites", Carbon vol. 26, No. 1, pp. 23–32, 1988.

*Primary Examiner*—Roy V. King
*Attorney, Agent, or Firm*—Sughrue, Mion, Zinn, Macpeak & Seas

[57] ABSTRACT

(1) A carbon film derived from a polyimide film, which has a tensile strength of at least 15 Kgf/mm$^2$, a tensile modulus of elasticity of at least 5000 Kgf/mm$^2$ and an electric conductivity of at least 200 S/cm.

(2) A process for preparing a carbon film which comprises the following steps:

1) reacting a monomer combination selected from the group consisting of a combination comprising a tetracarboxylic acid dianhydride and an aromatic diamine and a combination comprising a tetracarboxylic acid dianhydride, an aromatic diamine, and a polyamino compound having at least three amino groups to form a polyamic acid;

2) forming a film of polyamic acid;

3) imidizing the polyamic acid film to form a polyimide film having a tensile strength of at least 10 Kgf/mm$^2$ and a tensile modulus of elasticity of at least 500 Kgf/mm$^2$; and 4) carbonizing the polyimide film in an inert gas or in a vacuum until a carbon film having a tensile strength of at least 15 Kgf/mm$^2$, a tensile modulus of elasticity of at least 5000 Kgf/mm$^2$ and an electric conductivity of at least 200 S/cm is formed.

24 Claims, No Drawings

CARBON FILM AND PROCESS FOR PREPARING THE SAME

This is a divisional of application Ser. No. 07/890,155, filed May 29, 1992, now U.S. Pat. No. 5,352,524.

FIELD OF THE INVENTION

This invention relates to a carbon film having excellent mechanical characteristics and high electrical conductivity, obtained by heat-treating a polyimide film at an elevated temperature. It also relates to a process for preparing the same.

BACKGROUND OF THE INVENTION

Previously, carbon materials have been widely used as electrode materials, heating elements, structural materials, heat insulating materials, heat-resistant sealing materials, X-ray parts, and the like because of their excellent heat resistance, chemical resistance, and electrical conductivity. In particular, sheet-form carbon films are expected to be applicable to important uses as industrial materials as described above, and have been extensively studied in recent years.

Processes for preparing carbon films include a process in which a carbon film is prepared from natural graphite, a process in which a carbon film is prepared by the high-temperature decomposition deposition of a hydrocarbon in a gas phase, and a process in which a carbon film is prepared by treating an organic material or a carbonaceous material at an elevated temperature. Carbon films obtained from these processes are presently being applied to fields which utilize their excellent characteristics, such as heat resistance, chemical resistance, and electrical conductivity.

Among these processes for preparing carbon films, processes for obtaining a carbon film by heat-decomposing a polymer film have been extensively studied because of their simplicity, and many attempts have been made to improve the process as disclosed in JP-A-53-139676 (the term "JP-A" as used herein means an "unexamined published Japanese patent application"), JP-A-60-11215 (corresponding to U.S. Pat. No. 4,599,193), JP-A-60-235709, JP-A-62-91414 (corresponding to U.S. Pat. No. 4,915,984) and JP-A-1-105199 (corresponding to U.S. Pat. No. 4,842,665). Among the processes of the type described above, a process in which an aromatic polyimide film is used as the polymer film, which is heat-decomposed by heat-treating it at an elevated temperature to obtain a carbon film, is described in, for example, JP-B-64-12305 (the term "JP-B" as used herein means an "examined Japanese patent publication"). A process in which a polymer film is stretched and then carbonized is disclosed in, for example, JP-B-1-48204 (corresponding to U.S. Pat. Nos. 4,626,588 and 4,791,177).

Conventional carbon films exhibit satisfactory electrical conductivity or mechanical properties. However, a carbon film which exhibits both improved electrical conductivity and mechanical properties has not yet been produced. A carbon film having a tensile strength of at least 15 Kgf/mm$^2$, a tensile modulus of elasticity of at least 5,000 Kgf/mm$^2$ and an electric conductivity of at least 200 S/cm (S=mho), has not been previously produced.

For example, a graphite layer should be orderly arranged in the film by heat-treating the film at a temperature of at least 3000° C. in an oxygen-free atmosphere under high pressure to obtain a carbon film which exhibits excellent electrical conductivity. However, it is difficult to manufacture an apparatus which is to be operated at such a high temperature. In addition, carbon films obtained by such a high-temperature treatment are generally brittle, and do not always exhibit excellent mechanical properties.

Further, there is no known process for preparing a carbon film having a tensile strength of at least 15 Kgf/mm$^2$, a tensile modulus of elasticity of at least 5,000 Kgf/mm$^2$ and an electric conductivity of at least 200 S/cm using aromatic polyimides as a starting material.

SUMMARY OF THE INVENTION

An object of the present invention is to provide a carbon film derived from an aromatic polyimide, which has improved mechanical properties, particularly an improved tensile strength and tensile modulus of elasticity, as well as an improved electric conductivity.

Another object of the present invention is to provide a process for preparing a carbon film having an improved tensile strength and tensile modulus of elasticity and an improved electric conductivity from an aromatic polyimide.

The carbon film of the present invention is derived from an aromatic polyimide and has a tensile strength of at least 15 Kgf/mm$^2$, a tensile modulus of elasticity of at least 5,000 Kgf/mm$^2$, and an electric conductivity of at least 200 S/cm.

The process for preparing the carbon film of the present invention comprises reacting a monomer combination comprising a tetracarboxylic acid anhydride (component (A)) and an aromatic diamine (component (B)) to form a polyamic acid, forming a polyamic acid film, and imidizing the film by a dehydration-cyclization reaction to form a polyimide film having a tensile strength of at least 10 Kgf/mm$^2$ and a tensile modulus of elasticity of at least 500 Kgf/mm$^2$; and further heat-treating the film in an inert gas or in a vacuum to obtain a carbon film having a tensile strength of at least 15 Kgf/mm$^2$, a tensile modulus of elasticity of at least 5,000 Kgf/mm$^2$ and an electric conductivity of at least 200 S/cm.

A carbon film of the present invention may also be obtained from the monomer combination as described above and which further contains at least one polyamine compound (component (C)) having at least three amino groups.

DETAILED DESCRIPTION OF THE INVENTION

Typical examples of the tetracarboxylic acid dianhydride used as component (A) in the present invention include a tetracarboxy benzene dianhydride, a tetracarboxy dianhydride of a compound having 2 to 5 condensed benzene rings, and compounds represented by formula (I), and substituted compounds thereof:

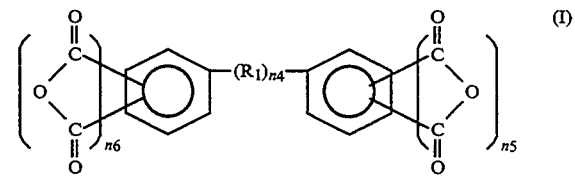

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group; $n_4$ is 0 or 1; $n_5$ is 0 or 1; and $n_6$ represents 1 or 2, provided that the sum of $n_5$ and $n_6$ is 2.

Examples of the tetracarboxylic acid dianhydrides include pyromellitic dianhydride, 3,3',4,4'-benzophenonetetracarboxylic acid dianhydride, 3,3',4,4'-biphenyltetracarboxylic acid dianhydride, 2,3,3',4'-biphenyltetracarboxylic acid dianhydride, 2,2',3,3'-biphenyltetracarboxylic acid dianhydride, 2,2',6,6'-biphenyltetracarboxylic acid dianhydride, 2,3,6,7-naphthalenetetracarboxylic acid dianhydride, 1,2,5,6-naphthalenetetracarboxylic acid dianhydride, 2,2-bis(3,4-dicarboxyphenyl)propane dianhydride, bis(3,4-dicarboxyphenyl)sulfone dianhydride, bis(3,4-dicarboxyphenyl)ether dianhydride, 3,4,9,10-perylenetetracarboxylic acid dianhydride, naphthalene-1,2,4,5-tetracarboxylic acid dianhydride, naphthalene-1,4,5,8-tetracarboxylic acid dianhydride, benzene-1,2,3,4-tetracarboxylic acid dianhydride and ethylene glycol bis(anhydrotrimellitate). These compounds may be used either alone or as a mixture of two or more.

Typical examples of the aromatic diamine used as component (B) are a phenylene diamine, a diamino pyridine, a diamino compound having 2 to 8 condensed benzene rings, compounds represented by formula (II), and substituted compounds thereof:

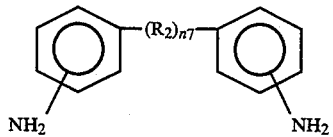

(II)

wherein $R_2$ represents —O—, —CO—, —SO$_2$—, —SO—, a phenylene group, an alkylene group, a phenylene alkylene group, a phenylene dialkylene group, or

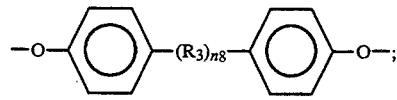

$n_7$ is 0 or 1; $R_3$ represents —O—, —CO—, —SO$_2$—, —SO—, a phenylene group, an alkylene group, or a phenylene alkylene group, a phenylene dialkylene group; and $n_8$ is 0 or 1.

Examples of the aromatic diamine include m-phenylenediamine, p-phenylenediamine, benzidine, o-toluidine, benzidine derivatives such as 3,3'-dichloro-4,4'-diaminobiphenyl, 4,4'-diaminodiphenylmethane and 4,4'-diaminodiphenyl ether, 4,4'-diaminodiphenylpropane, 3,3'-diaminodiphenylmethane, 4,4'-diaminodiphenyl sulfide, 4,4'-diaminodiphenyl sulfone, 3,3'-diaminodiphenyl sulfone, 3,4'-diaminodiphenyl sulfone, 3,3'-diaminodiphenyl ether, 3,4'-diaminodiphenyl ether; 4,4'-diaminobenzophenone, 3,3'-diaminobenzophenone, 2,2'-bis-(4-aminophenyl)propane, 3,3'-diaminobiphenyl, 2,6-diaminopyridine, 2,5-diaminopyridine, 3,4-diaminopyridine, bis[4-(4-aminophenoxy)phenyl]sulfone, bis[4-(3-aminophenoxy)phenyl]sulfone, bis[4-(4-aminophenoxy)phenyl]ether, bis[4-(3-aminophenoxy)phenyl]ether, 2,2'-bis[4-(4-aminophenoxy)phenyl]propane, 2,2'-bis[4-(3-aminophenoxy)phenyl]propane, 4,4'-bis(4-aminophenoxy)biphenyl, 1,4-bis(4-aminophenoxy)benzene, 1,3-bis(4-aminophenoxy)benzene, 2,2'-bis[4-(3-aminophenoxy)phenyl]hexafluoropropane, 1,5-diaminonaphthalene, 2,6-diaminonaphthalene, 4,4'-diaminotriphenyl, 4,4'-diaminotetraphenyl, 1,6-diaminonaphthalene, 1,4-diaminoanthracene, 1,8-diaminopyrene and substituted compounds thereof.

Examples of polyamino compounds as component (C) are represented by formula (III) or (IV):

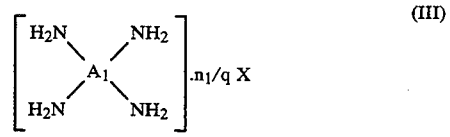

(III)

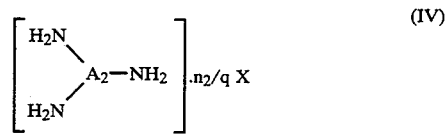

(IV)

wherein $A_1$ represents

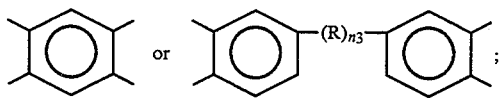

$A_2$ represents

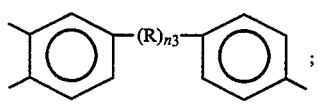

$n_1$ is 0 or an integer of 1 to 4; $n_2$ is 0 or an integer of 1 to 3; X represents an acid; q is the base number of the acid; R represents —O—, —CH$_2$—, —CO— or -S$_2$—; and $n_3$ is 0 or 1; and $A_1$ and $A_2$ may be substituted.

The acid represented by X in formulae (III) and (IV) may be either an organic or inorganic acid. Examples of the acid include p-toluenesulfuric acid, picric acid, and hydrochloric acid.

The substituents for the above described compounds represented by formula (I), (II), (III) or (IV) should not adversely affect the condensation reaction and should not deteriorate characteristics of the products obtained therefrom. Examples of such substituents include an aliphatic hydrocarbon group and a halogen atom (e.g., methyl, ethyl, propyl, butyl, isopropyl, tert-butyl, Cl and Br).

These monomers may be used either alone or as a mixture of two or more of them.

Typical examples of the polyamino compounds used as component (C) include 3,3',4,4'-tetraaminodiphenyl ether, 3,3',4,4'-tetraaminodiphenylmethane, 3,3',4,4'-tetraaminobenzophenone, 3,3',4,4'-tetraaminodiphenyl sulfone, 3,3',4,4'-tetraaminobiphenyl, 1,2,4,5-tetraaminobenzene, 3,3',4-triaminobiphenyl, 3,3',4- triaminodiphenylmethane, 3,3',4-triaminobenzophenone, 3,3',4-triaminodiphenylsulfone, and 1,2,4-triaminobenzene, and their mono-, di-, tri- or tetra-acid salts such as 3,3',4,4'-tetraaminodiphenyl ether tetrahydrochloride, 3,3',4,4'-tetraaminodiphenylmethane tetrahydrochloride, 3,3',4,4'-tetraaminobenzophenone tetrahydrochloride, 3,3',4,4'-tetraaminodiphenyl sulfone tetrahydrochloride, 3,3',4,4'-tetraaminobiphenyl tetrahydrochloride, 1,2,4,5-tetraaminobenzene tetrahydrochloride, 3,3',4-triaminodiphenylmethane trihydrochloride, 3,3',4-triaminobenzophenone trihydrochloride, 3,3',4-triaminodiphenylsulfone trihydrochloride, 3,3',4-triaminobiphenyl trihydrochloride, and 1,2,4-triaminobenzene dihydrochloride. The above compounds usually exist in the hydrated form. These compounds may be used either alone or as a mixture of two or more.

A polyamic acid which is used in the present invention is obtained by polyaddition reaction of components (A) and (B) or components (A), (B) and (C). Upon reaction each of anhydride groups is opened and a carboxylic aid group and an amido group forming a polymer chain are formed.

The polyamic acid film can be obtained by casting or coating a polymer solution of the polyamic acid on a support.

When component (C) is used for preparation of a polyamic acid by solution polymerization, a polyamic acid having a three-dimensional network molecular structure can be obtained in a gel form. Therefore, it is convenient to form a polyamic acid film prior to starting the gelation and then to proceed to gelation and completion of the polymerization reaction. This is disclosed in the commonly assigned U.S. patent application Ser. No. 07/586,103 (filed Sep. 21, 1990, now abandoned corresponding to European Patent 418889A.

When the above-described tetraamino compounds and triamino compounds used as component (C) are not in the form of an addition salt, the time taken for gelation is considerably reduced. Thus, it is preferred to use component (C) in the form of an addition salt. The amount of the addition salts is preferably 50 to 100 mol %, more preferably 75 to 100 mol % based on the total moles of the polyamino compounds.

The thickness of the polyamic acid film is preferably from 1 to 1,000 μm, and more preferably from 10 to 100 μm, to ensure easy handling.

Examples of support material include glass, metals, ceramics, and polymer resins, such as a polyester resin.

The polyamic acid film formed on the support may be subjected to a dehydration-cyclization reaction after peeling, or without peeling the film from the support.

The polyamic acid of the present invention can be obtained by reacting the components (A) and (B), or (A), (B) and (C) in an organic solvent, generally at a temperature of −30° to 80° C., preferably −5° to 50° C., more preferably 0° to 30° C., in an inert atmosphere. The reaction time is not longer than 10 hours, preferably not longer than 6 hours, more preferably not longer than 2 hours. When the reaction time exceeds 10 hours, a hydrolysis reaction often occurs. Usually, the reaction time is at least 5 minutes, and preferably at least one hour.

It is necessary that the organic solvent used for the reaction be inert to the reaction and capable of dissolving the components (A), (B) and (C) to be reacted. Typical examples of the organic solvent include N,N-dimethylformamide, N,N-dimethylacetamide, N,N-diethylformamide, N,N-diethylacetamide, dimethyl sulfoxide, N-methyl-2-pyrrolidone, N,N-dimethylmethoxyacetamide, hexamethylphosphoamide, pyridine, dimethyl sulfone, tetramethylene sulfone, phenols such as cresol, phenol and xylenol, benzene, toluene, xylene, benzonitrile, dioxane and cyclohexane. These solvents may be used either alone or as a mixture of two or more of them.

A film of a polyamic acid obtained from components (A) and (B) can also be formed by an optional method, for example, by casting and drying a solution of a polyamic acid on a support. Examples of the solvent for the coating solution are the same as those recited for the polymerization reaction above. The concentration of the polyamic acid in the casting solution is preferably from 5 to 20 wt %.

Further, a polyamic acid film can be obtained in the following manner. The film of the polyamic acid, which contains the organic solvent, is immersed in or washed with a coagulating liquid comprising a poor solvent for the polyamic acid, whereby the organic solvent left in the film is removed by the substitution with the poor solvent. In this operation, water is generally used as a coagulating liquid. Alcohols such as methanol and ethanol may be used with water in an amount of not more than 50% by weight based on the total amount of the coagulating liquid. Further, ketones such as acetone, amide solvents such as N,N-dimethylacetamide and chlorine-containing solvents such as 1,2-dichloroethane may be used in an amount of not more than 20% by weight based on the total weight of the coagulating liquid. When the above-described washing of the film is conducted, impurities such as chlorine contained in the film can be removed sufficiently.

It is preferred from the viewpoint of handling, especially when component (C) is also used, that the amount of the polyamic acid in the reaction mixture after completion of the reaction is from 3 to 50% by weight, preferably from 5 to 20% by weight, based on the total weight of the polyamic acid and solvent. When the concentration of the polyamic acid is lower than 3% by weight, the resulting polyamic acid gel is poorly free-standing, while when the concentration exceeds 50% by weight, the solids content is too high, the viscosity of the solution is increased during the course of the polymerization and the polymerization reaction does not proceed as expected.

The molar ratio of component (A) to component (B) to component (C) (hereinafter referred to as (A)/(B)/(C)) to be reacted preferably is 100:60-100:0-20 (such ratios are hereinafter designated as follows: 100/(60-100)/(0-20).

Generally, it is preferred that when the polyamic acid is prepared from the tetracarboxylic acid dianhydride and the aromatic diamine, both components are reacted in an equimolar ratio as much as possible to increase molecular weight. Therefore it is preferable that the molar ratio of (A)/(B) is 100/(60-100), more preferably 100/(70-100), and most preferably 100/(80-100) When component (C) is also used the molar ratio of (A)/(B)/(C) is preferably 100/(60-100)/(1-20), more preferably 100/(70-100)/(4-15), and most preferably (100)/(80-100)/(4-15) to increase the degree of polymerization. Furthermore, the components (A), (B) and (C) preferably are used in proportions such that the difference of the molar number of the reactive groups of the tetracarboxylic acid dianhydride (which is two per molecule of acid dianhydride) and the total molar number of the reaction groups of the aromatic diamine and the polyamine compound is adjusted to a value within ±5%. That is, a preferred equivalent ratio of reactants is as follows:

$$0.95 < \frac{\text{equivalents of carboxylic acid anhydride}}{\text{equivalents of amine}} < 1.05$$

Therefore, when a tetraamino compound is used as component (C) the following relationship should be satisfied: $0.95 \times [\text{moles of (B)} + 2 \times \text{moles of (C)}] < \text{moles of (A)} < 1.05 \times [\text{moles of (B)} + 2 \times \text{moles of (C)}]$.

When the molar ratio of (C)/(A) is lower than 1/100, the formation of the three-dimensional network structure is insufficient, that is, gelation tends not to occur.

When the molar ratio of (C)/(A) is higher than 20/100, the reaction proceeds rapidly, the resulting gel is suspended as small pieces in the solvent and a uniform product is difficult to obtain. Accordingly, when a polyimide film is prepared through gelation of the polyamic acid, the molar ratio of (C)/(A) preferably should be (1–20)/100.

The reaction of the components (A) and (B), or (A), (B) and (C) is a polymerization reaction of the carboxylic anhydride and amino compounds. The component (A) may be added to a solution of the component (B) or components (B) and (C) dissolved in an organic solvent, in an inert atmosphere such as nitrogen gas. The component (A) may be added in the form of a solid or a solution thereof in a solvent. Alternatively, the component (B) or the components (B) and (C) may be added to a solution of the component (A) dissolved in an organic solvent. If desired, the component (C) may be added during the course of the reaction of the component (A) with the component (B). A still further alternative is to add the component (B) to a reaction system where predetermined amounts of the components (A) and (C) are reacted, but when following this alternative there is a possibility that the reaction will not proceed sufficiently and that gelation may not occur depending on preparation conditions.

The molecular weight of the polyamic acid is preferably 10,000 to 300,000, more preferably 30,000 to 300,000.

The degree of crosslinking in the network molecular structure of the polyamic acid can be increased by heating (usually 50 to 80° C.), subjecting to light (such as ultraviolet ray) or by applying pressure (usually up to 3.0 Kg/cm$^2$).

In addition to the components (A) and (B) or components (A), (B) and (C), the reaction mixture may contain small amounts (usually up to 10 wt % based on the component (A)) of a di- or tricarboxylic acid, a carboxylic acid anhydride or a substituted compound thereof (e.g., trimelitic acid, trimelitic acid anhydride, isophthalic acid dichloride, terephthalic acid dichloride and trimelitic acid dichloride).

The three-dimensional structure of the polyamic acid containing about 50 to 97% (based on the total weight of the polyamic acid and the solvent) by weight of the above-described organic solvent is a free-standing gel.

The amount of the solvent in the three-dimensional structural product of the polyamic acid can be controlled by swelling or shrinkage by the absorption or desorption of the solvent. Shrinkage (deswelling) can be conducted by heating preferably at up to 80° C. under reduced pressure or by solvent replacement using a poor solvent. The number of linkages in the chemical structure of the gel can be increased by external influences such as temperature, light and pressure. Swelling can be conducted by immersing the polyamic acid in an organic solvent, for example at 0° to 80° C., for 1 to 60 minutes.

The polyimide film can be obtained by subjecting the polyamic acid film to a conventional imidization which is carrying out by a dehydration-cyclization reaction, i.e., by the following reaction:

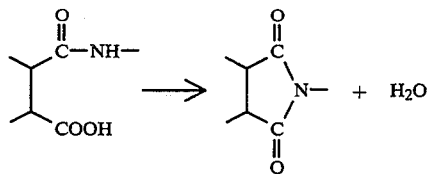

For example, imidization can be conducted by a high-temperature treatment or a chemical dehydrating treatment using a dehydrating agent.

Methods for preparation of the polyimide which can be used in the present invention are disclosed in U.S. patent application Ser. No. 07/586103 filed Sep. 21, 1990, EP 418889, U.S. Pat. No. 4,690,999, JP-A-63-178133, JP-B-46-20600, JP-B-44-19878, JP-B-44-26311, and EP-A-274603 (corresponding to JP-A-63-215726).

When imidization is to be conducted by a high-temperature treatment of a polyamic acid derived from components (A) and (B), the film of the polyamic acid is dried until the amount of the solvent is reduced to 0 to 10% by weight at al temperature of 50° to 200° C. for at least 10 seconds prior to subjecting the film to a heat-treatment for conducting imidization.

When the polyamic acid is in a gel state, i.e., contains a solvent, the film is preferably dried at 30° to 80° C. for 0.5 to 10 hours, more preferably at 30° to 50° C. for 1 to 5 hours until the solvent in the film becomes preferably 0 to 50% by weight, more preferably 40% by weight or less. Usually, the temperature is gradually elevated in order to maintain the form of the film.

The polyamic acid film which is in a dried state (or in a deswollen state) is subjected to heating for conducting the imidization. The heating is usually conducted at 150° to 500° C. for 10 seconds to 10 hours, preferably at 200° to 400° C. for 1 to 5 hours.

The heat treatment can be carried out while fixing both ends of the polyamic acid film in the longitudinal direction of the film by means of a fixing frame, a fastener or a pin guide, to obtain a film exhibiting excellent dimensional stability and mechanical characteristics. This method is very effective, because the film of the polyamic acid is shrunk by drying or heat treatment in particular.

The imidization can be confirmed by observing infrared spectral absorption at 1780 cm$^{-1}$ and 1720 cm$^{-1}$.

The imidization of the polyamic acid can be conducted while retaining the polyamic acid film in a wet state. For example, a method wherein dehydration and cyclization are chemically carried out by impregnating the polyamic acid film with a solution of a dehydrating agent may be used. Alternatively, the polyamic acid film may be subjected to a chemical treatment after the organic solvent is removed from the film or after the organic solvent is replaced with a poor solvent.

It is effective to use acid anhydrides as dehydrating agents in the presence of amines as catalysts in the chemical dehydration reaction. Examples of the acid anhydrides include aliphatic acid anhydrides such as acetic anhydride, propionic anhydride and butyric anhydride and benzoic anhydride. These compounds may be used either alone or as a mixture of two or more.

Examples of the amines which can be used as catalysts for the chemical dehydration reaction include tert-amines such as trimethylamine, triethylamine, triethylenediamine, hexamethylenetetraamine, tributylamine, dimethylaniline, pyridine, α-picoline, β-picoline, γ-picoline, isoquinoline and lutidine. At least one amine selected from the group consisting of tert-amines is used as a catalyst.

The amount of the acid anhydride to be added in the chemical dehydration reaction is preferably 1 to 5 equivalents, more preferably 1 to 3 equivalents per equivalent of carboxyl group present in the polyamic acid. The amount of the catalyst in the chemical dehydration reaction is preferably 0.01 to 1.5 equivalents, more preferably 0.2 to 1 equivalent per equivalent of carboxyl group present in the polyamic acid.

The acid anhydride and the amine are dissolved in an organic solvent for these compounds to form a solution used for the dehydration reaction. Examples of solvents include the above-described solvents for components (A), (B) and (C). The concentration of the acid anhydride is usually 1 to 10% by weight based on the total weight of the polyamic acid solution.

The chemical treatment for imidization is preferably conducted at 0° to 80° C. for 0.5 to 48 hours.

The polyimide film which is used as the precursor of the carbon film in the present invention has a high tensile strength, and a high tensile modulus of elasticity.

In order to obtain carbon film of the present invention it is necessary that the polyimide film have a tensile strength of at least 10 Kgf/mm$^2$ preferably at least 15 Kgf/mm$^2$, and more preferably at least 20 Kgf/mm$^2$, and a tensile modulus of elasticity of at least 500 Kgf/mm$^2$ preferably at least 800 Kgf/mm$^2$, and more preferably at least 1,000 Kgf/mm$^2$. If the polyimide film has a lower tensile strength or tensile modulus of elasticity than those described above, the film of the polyamic acid, which is the precursor of the polyimide, or the polyimide film must be stretched, preferably more than 1.0 times its original length. This allows the molecular chain of the polymer to be arranged mainly in one or two (biaxial) direction, which increases the tensile strength and the tensile modulus of elasticity of the polyimide film. In the stage of the polyamic acid film, the stretching of the film can be readily performed, and a highly oriented film can be obtained. The stretching can be conducted in one direction, or in two directions which are permitted not to be the same stretching ratio for the cross direction.

Stretching can be conducted by any conventional method, for example, by a tentering method and a roll method.

Stretching is usually conducted at a ratio of more than 1 times and up to 3 times, preferably from 1.2 to 2 times original length. In the case of one direction stretching, stretching can be conducted to more than 3 times original length, up to the ratio at which the film is destroyed. However, usually it is not necessary to conduct the stretching at a ratio of greater than 5 times original length.

Any of conventional stretching methods including the tenter system and roll system can be used. If an organic solvent capable of swelling the film or a liquid functioning as a plasticizer is contained in the film (polyamic acid film or partially imidized polyamic acid film), the stretching of the film is facilitated and a polyimide film having a high drawing ratio can be prepared. The partially imidized polyamic acid film can be obtained by imidizing polyamic acid preferably up to 50%, more preferably up to 30% of amido groups by heating the polymer at 100° to 150° C. for 30 to 120 minutes, or by treating the polyamic acid using a dehydration agent in an amount of 1 to 50 equivalents based on the equivalent number of amido groups in the polymer at 0° to 50° C. for 1 to 24 hours. For example, by adding 1 to 50 equivalents of an acid anhydride and an amine catalyst to a polyamic acid solution and by stirring the thus obtained reaction mixture for 3 to 12 hours, a partial imidization can be completed. The completion of a partial imidization can be determined by an IR measurement. Further imidization is conducted after forming film.

Examples of the liquid capable of swelling the film include N,N-dimethylformamide and N-methyl-2-pyrrolidone which are used in the polymerization reaction of the polyamic acid. Further, there can be used phenols, hydrocarbons, ketones, alcohols and ethers.

Examples of the liquid which functions as plasticizer include ethylene glycol and an esterified product of ethylene glycol (e.g., diethyleneglycol diethylether and ethyleneglycol monoethylether).

The polyimide film obtained by a dehydration cyclization reaction of a stretched polyamic acid film has improved tensile strength and tensile modulus of elasticity (which is measured in the same direction as that of the stretching or in the direction providing the highest values of tensile strength and tensile modulus of elasticity), and is preferred as the precursor of a high performance carbon film.

As the tetracarboxylic acid dianhydride used in the present invention, it is preferred to use pyromellitic dianhydride or biphenyltetracarboxylic acid dianhydride either singly or as a mixture of two or more of the tetracarboxylic acid dianhydrides. Pyromellitic dianhydride and biphenyltetracarboxylic acid are preferred to obtain a polyimide film having high-tensile strength and high-tensile modulus of elasticity. When these tetracarboxylic acid dianhydrides are used with other tetracarboxylic acid dianhydrides, it is preferable to use them in an amount of at least 80 mol %, more preferably at least 85 mol %, and most preferably at least 90 mol % based on the total number of mols of the dianhydrides.

As the aromatic diamine, it is preferred to use p-phenylenediamine, benzidine, o-toluidine, benzidine derivatives such as 3,3'-dichloro-4,4'-diaminobiphenyl, 4,4'-diaminodiphenylmethane and 4,4'-diaminodiphenyl ether, either singly or as a mixture of two or more of the aromatic diamines. These diamines are preferred to obtain a high-tensile strength, high-tensile modulus of elasticity polyimide film which is the precursor of the carbon film of the present invention. When these aromatic amines are used with other aromatic diamines, it is preferable to use them in an amount of 80 mol %, more preferably at least 85 mol %, and most preferably at least 90 mol % based on the total number of mols of the diamines.

Among the polyamino compounds described above, the use of 3,3',4,4'-tetraaminobiphenyl tetrahydrochloride and 1,2,4-triaminobenzene dihydrochloride singly or as a mixture with other polyamic compounds, is preferred to obtain a polyimide film having a high-tensile strength, and a high-tensile modulus of elasticity, which is the precursor of the carbon film of the present invention. It is preferable to use these compounds in an amount of at least 10 mol %, more preferably at least 15 mol %, and most preferably at least 20 mol % based on the total number of mols of the polyamino compounds.

The polyimide film obtained from these preferred components has a high-tensile strength and a high-tensile modulus of elasticity because such a polyimide has molecular chains which are rigid and highly crystalline.

The polyimides may be prepared using one or more tetracarboxylic acid dianhydrides and one or more aromatic diamines as the monomer components, or the polyimides may also be prepared by further using one or more polyamino compounds, and hence the resulting polymer may be a copolymer. Further, the polyimide may be in the form of a blend of polyimides comprised of different monomer components.

The polyimide film which is the precursor of the carbon film of the present invention may contain at least one other high molecular weight component, and may be used in the form of a composite film. Any conventional high molecular weight component which is soluble in the polyamic acid solution can be used to provide the composite film. Examples of the high molecular weight component include polyamic acids (a polyamic acid mainly comprising of components (A) and (B) or (A), (B) and (C) but being different combination thereof or proportion thereof from that of the polyamic acid which is the precursor of the basic polyimide may also be used), polyimides, polyamideimides, polyetherimides, polybenzimidazole; polybenzoxazole, polybenzthiazole, aromatic polyamides and polyacrylonitrile. It is preferred that these high molecular weight components have properties which enable them to be carbonized by a high temperature treatment for carbonization and graphitized.

The amount of the high molecular weight component to be blended varies, depending on the type of the high molecular weight components to be blended, but it is preferred to add an amount which does not have an adverse effect on the strength and modulus of elasticity of the polyimide film. Preferably, the high molecular weight component is used in an amount of not more than 20% by weight based on the entire weight of the polyimide film. These high molecular weight components include various modified polymers, copolymers, precursors and oligomers. When the high molecular weight components are precursors or oligomers, they may be formed into a high molecular weight component by, for example, a polymerization after a composite is formed.

The high molecular weight component can be introduced into the polyimide film by incorporating an organic solution of the component into the polyamic acid solution.

The tensile strength and the tensile modulus of elasticity of the polyimide film which is the precursor of the carbon film can be increased by stretching, (a) a polyamic acid film composed of the above-described monomers, (b) a polyamic acid film wherein the polyamic acid is partially imidized (usually not more than 10% of amido groups), (c) a polyimide film which does not contain the other polymer or (d) a polyimide composite film containing the other polymer. Stretching can be conducted as described above.

A polyamic acid film obtained from components (A), (B) and (C) through high-molecular weight gelation of the polyamic acid readily provides polyamic acid film having a very high degree of orientation by stretching, especially by uniaxial stretching. The polyimide film obtained by the dehydration-cyclization reaction of such an orientated polyamic acid film has a high-strength and high-modulus of elasticity and can be preferably used as a polyimide film in the invention.

A polyimide film prepared from a polyamic acid obtained by the polymerization reaction of monomers comprising pyromellitic dianhydride (component (A)), and p-phenylenediamine (component (B)) and comprising at least 80% (based on the entire repeating units of the polymer) of a repeating unit of poly(p-phenylenepyromellitic imide), represented by the following general formula (V), is preferred.

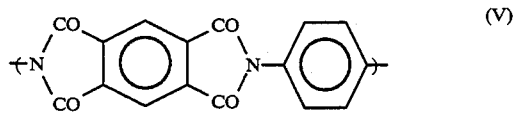
(V)

A polyimide having the repeating unit represented by formula (V) is highly crystalline and has a rigid polymer molecular chain.

A film of a polyimide wherein at least 80% of the repeating units are those represented by formula (V) is an especially superior polyimide film for preparing a carbon film having a well-grown graphite layer, a high tensile strength, a high modulus of elasticity, a high electric conductivity, and a high density.

By carbonization, the polyimide film undergoes a cyclization reaction involving the cleavage and recombination of the molecular chain during the course of the carbonization. In this case, —CO— and —N= bonds contained in the molecular structure which forms the polyimide are taken out as $CO_2$ and HCN gases during the course of the carbonization, and the remainder proceeds to graphitization.

The polyimide film mainly comprising a poly(p-phenylene-pyromellitic imide) structure has rigid molecular chains and has a nearly linear molecular structure. Thus, the polymer is highly crystalline and the molecular chains of the polymer are closely packed. Further, the polyimide film contains relatively fewer molecular bonds such as ether or ester bonds (e.g., —$SO_2$—, -$CO_2$—, —O—, —S—) which interfere with the carbonization.

In the polyimide having such a structure, undesired elements are scarcely incorporated therein during the course of the carbonization. The reaction mechanism thereof into a graphitization structure by the re-combination of the molecular chain can be simplified, the degree of carbonization is high, even at a relatively low carbonization temperature, and a structure closely allied to graphite can be easily formed. Accordingly, in the process using the polyimide film, the degree of carbonization is high, and the density is high, so a carbon film having excellent mechanical properties, such as a high strength and a high modulus can be obtained.

To prepare a carbon film having a high tensile strength, a high tensile modulus of elasticity, and a high electric conductivity, it is preferred that the molecular structure of the polyimide be a 100% poly(p-phenylenepyromellitic imide) structure. However, since the polyimide having such a structure is too highly crystalline, the resulting film is brittle, its tensile strength is not sufficient, and handleability as a polyimide film is poor, and as a result the film easily be cracked or broken during handling, and it is difficult to obtain a polyimide film having a large area in an industrial level.

A polymer blend or a copolymer is generally used as a means for improving the brittleness of the highly crystalline polyimide film. The copolymerization of the poly(p-phenylene-pyromellitic imide) structure is proposed by JP-A-64-254131. The specification thereof discloses that it is preferred the amount of the poly(p-phenylene-pyromellitic imide) structure should be not more than 80% by weight to improve the brittleness of the polyimide film and to obtain a film having excellent mechanical properties. Accordingly, the moldability of the film is considerably reduced by the introduction of the rigid chain structure.

However, as a result of investigation it has been found that a film comprising polyimide wherein at least 80% of repeating units are those of the rigid poly(p-phenylene-pyromellitic imide) structure provides a high-performance carbon film. It is very difficult to prepare a highly rigid polyimide film. However, it is possible to prepare a large-area polyimide film without brittle fracture, even when the film comprises a polyimide wherein at least 80% of the repeating units are those of poly(p-phenylene-pyromellitic imide), by improving the moldability of the film by introducing a polyfunctional monomer into the polyimide as described in JP-A-3-146524 (corresponding to U.S. patent application Ser. No. 07/586103 filed Sep. 21, 1990 and EP 418889A) or improving the molding stage of the film, for example, by gradually imidizing the polyamic acid film taking a longer time of period.

Examples of monomers which can be preferably introduced into the polyimide as other monomer component than monomer components of the poly(p-phenylene-pyromellitic imide) include tetracarboxylic acid dianhydrides such as biphenyltetracarboxylic acid dianhydride and benzophenonetetracarboxylic acid dianhydride and aromatic diamines such as m-phenylenediamine, benzidine, o-toluidine, 3,3'-dichloro-4,4'-diaminobiphenyl, 4,4'-diaminodiphenylmethane and 4,4'-diaminodiphenyl ether. These monomers usually is introduced into the polyimide in an amount of 1 to 20 mol % based on the total moles of components. These monomers are introduced to the polyimide by adding them into the reaction mixture for preparation of the polyamic acid.

Particularly, it is preferred that component (C) such as 3,3',4,4'-tetreaminobiphenyl tetrahydrochloride, is also used in the polyamic acid to obtain poly(p-phenylene-pyromellitic acid).

When the strength of the polyimide film is not sufficient, it is also preferred that the imidation is conducted gradually at 100° to 150° C. for 4 to 5 hours while providing 10 to 30% shrinkage to the film.

The carbon film of the present invention is obtained by carbonizing the polyimide film by heating it in an inert gas such as argon, helium, nitrogen and hydrogen, or in a vacuum (preferably 1 mmHg or less). The heating may be conducted at 800° C. or higher. The heating is usually conducted at 1,000° C. or higher, and preferably at 1,200° C. or higher. In order to avoid curling or shrinking of the film during heating at 1000° C. or higher, it is preferred that the film be preheat-treated. The preheating is usually conducted at 500° to 800° C., preferably at 600° to 700° C. for 60 minutes. The preheat-treatment is preferably conducted until the weight reduction of the film reaches at least 40 to 50% by weight.

When the highly oriented, high-strength, high-modulus polyimide film having a highly ordered molecular chain structure is used, the carbonization proceeds in a state in which the polymer molecular chain is arranged in one direction, and hence there can be obtained a high-performance carbon film in which the graphite layer is highly ordered, particularly in the molecular chain orientation direction. In this case, even when the carbonization treatment is carried out at a relatively low temperature of less than 2000° C., a carbon film can be formed which has a well-grown graphite layer, a high strength and a high modulus of elasticity, and exhibits excellent electrical conductivity.

In a carbon film obtained by carbonizing a polyimide film which does not satisfy the mechanical strength requirements of the present invention, the polymer molecular chain is relatively randomly oriented.

Namely, in the carbon film of the present invention, a film is used in which the polymer molecular chain of the precursor is highly oriented, mainly in one direction. Hence, crosslinking between neighboring molecules at a treating temperature (usually of not lower than 1000° C.), that is, graphitization by the cyclization reaction is very easily conduced, and a high-performance carbon film may be produced in which the graphite layer is highly ordered in the orientation direction of the molecular chain. Such a structure is different in the growth direction and arrangement of the graphite layer from the carbon film prepared from the precursor in which the arrangement of the molecular chain is random. In the present invention, by raising the carbonizing temperature, carbon film having a well-grown graphite layer which provides high-performance can be obtained. However, even at a relatively low carbonization temperature, such as lower than 2000° C., carbon film having high-performance as disclosed hereinabove can be obtained.

It is preferred that the polyimide film which is to be carbonized be placed between highly heat-resistant sheets, such as graphite sheets or quartz glass sheets, and subjected to the preheat-treatment or the heat-treatment for carbonization. Thus, a change in shape, such as the twisting or warpage of the film due to shrinkage of the film caused by heat decomposition, can be prevented, and a carbon film having a relatively smooth surface can be obtained. During these heat-treatment, usually no tension is applied to the film.

It is necessary that the film be heated at such a heating rate that the polyimide film is not deteriorated during treatment, for example, voids or wrinkle is not caused. It is preferred that the temperature be raised to 1000° C. at a heating rate of not greater than 10° C./min, preferably from 1° to 5° C./min, and in the treatment at 1000° C. or higher, the temperature be raised at a heating rate of not greater than 20° C./min, preferably from 1° to 5° C./min.

A carbon film having a higher tensile strength, a higher tensile modulus of elasticity, and a higher electrical conductivity can be obtained by carbonizing the polyimide film at a higher temperature.

When the heat-treating temperature is higher than 3500° C., a marked chemical change such as sublimation of the carbon component in the film takes place, and the film becomes brittle. Hence, a temperature of higher than 3500° C. is not preferred. The preferred heat-treating temperature is 3000° C. or lower.

In the carbonization treatment, a carbonization catalyst may be employed. Not more than 20% by weight, preferably 1 to 5% by weight based on the total weight of polyimide film. A compound of a metal element, such as, a Group IVa, Va or VIII element of the Periodic Table, for example, Ge, Sn, As, Sb, Fe, Co, Ni, Ru, Rh, Pb, Pt or Pd may be used as a catalyst for carbonization. Examples of the metal compound include a metal chloride such as ferrous chloride, nickel chloride or cobalt chloride.

It is preferred that the catalyst for carbonization, preferably in a molecular state, be dispersed in the polyimide film by incorporating the carbonization catalyst, for example, into a polyamic acid solution. Then, the carbonization treatment is carried out. By using the carbonization catalyst the degree of graphitization increases and a homogeneous carbon film can be easily obtained.

The graphite layer of the carbon film of the present invention preferably is doped with a specific material, that is, with a dopant which forms a intercalated carbon film, to thereby provide a carbon film having a higher electrical conductivity. The carbon film of the present invention can be doped by any conventional method. Examples of doping methods include a method wherein a dopant capable of forming an intercalated carbon film in the carbon film is directly brought into contact with the film in a vapor phase or in a liquid phase, and a method wherein a dopant capable of forming an intercalated carbon film is introduced into the film by means of an electrochemical method.

Examples of the dopant which is effective in enhancing the electrical conductivity of the carbon film include alkali metals, halogen compounds and Lewis acids. Specific examples of the dopant include KBr KI, $FeCl_3$, $CuCl_3$, $AsF_5$, $SbF_5$, $HNO_3$ and $H_2SO_4$.

The amount of the dopant to be incorporated in the carbon film is preferably 0.1 to 150% based on the total weight of the carbon film excluding the dopant, though there is no particular limitation with regard to the amount of the dopant.

The carbon film of the present invention has metallic luster, a tensile strength of not less than 15 $Kgf/mm^2$ which is preferably not less than 20 $Kgf/mm^2$, more preferably not less than 25 $Kgf/mm^2$, a tensile modulus of elasticity of not less than 5,000 $Kgf/mm^2$ which is preferably not less than 8,000 $Kgf/mm^2$, more preferably not less than 10,000 $Kgf/mm^2$, and an electrical conductivity of not less than 200 S/cm which is preferably not less than 280 S/cm, more preferably not less than 300 S/cm. The carbon film has a high density which is usually at least 1.70 $g/cm^3$.

According to the present invention the tensile strength can be raised up to about 100 $Kgf/mm^2$, the tensile modulus of elasticity can be raised up to about 20,000 $Kgf/mm^2$ and the electrical conductivity can be raised up to about 2,000 S/cm.

The amount of carbon in the carbon film is preferably at least about 85 wt % and the amount of each of hydrogen, oxygen and nitrogen is 10 wt % or less. The amount of carbon is more preferably at least 90 wt %, and most preferably at least 95 wt %. This element analysis is based on the substance derived from the polymer(s) in the carbon film.

The carbon film of the present invention can be used in the fields of electrode materials, heating elements, structural materials, heat insulating materials, heat-resistant sealing materials, parts for X-ray apparatuses, etc. Accordingly, the carbon film has many industrial uses and is a useful material.

EXAMPLE 1

In a 300 ml four-necked separable flask, there were placed 0.0184 mol (1.989 g) of purified p-phenylenediamine (abbreviated as PPD) and 0.0008 mol (0.288 g) of 3,3',4,4'-tetraaminobiphenyl tetrahydrochloride dihydrate (TABT). To the flask was then added 50 g of distilled N-methyl-2-pyrrolidone (abbreviated to NMP). The mixture was stirred to dissolve them.

The temperature of an external water bath was controlled to 5° C., and in a nitrogen atmosphere, while stirring the solution obtained above, 0.02 mol (4.366 g) of purified anhydrous pyromellitic dianhydride (PMDA) in the form of a solid was gradually added thereto with care so that the temperature of the solution was not raised.

After all of PMDA was added, stirring was continued for 20 minutes. The uniform solution of a polyamic acid obtained was cast on a glass sheet. The coating amount of the solution was controlled by a spacer to 460 $g/m^2$. On standing for 60 minutes, the cast polymer solution was gelled and a gel film of the polyamic acid was obtained.

The resulting gel film of the polyamic acid was free-standing.

The gel film of the polyamic acid was dried at 30° C. under vacuum to adjust the content of the solvent in the film to 20% by weight based on the total weight of the film.

The polyamic acid film was fixed to a steel frame and stepwise heat-treated at 100° C. for one hour, at 200° C. for one hour, at 300° C. for one hour and at 400° C. for one hour to obtain a polyimide film. The heating rate in the heat-treatment was 5° C./min. The film was found to have a tensile strength of 18 $Kgf/mm^2$ and a tensile modulus of elasticity of 800 $Kgf/mm^2$. Therefore, the film has a high strength and a high modulus.

The polyimide film was put between two graphite sheets and treated in a nitrogen gas atmosphere in a carbonization furnace at such a heating rate that the temperature was raised to 600° C. at a heating rate of 0.5° C./min, further raised to 1000° C. at a heating rate of 1.5° C./min, and then the film was heat-treated at 1000° C. for 90 minutes.

The film was gradually cooled to room temperature and removed from the carbonization furnace. The resulting carbon film had a thickness of 40 $\mu$m and metallic luster and was found to have a tensile strength of 15 $Kgf/mm^2$, a tensile modulus of elasticity of 5,000 $Kgf/mm^2$, an electric conductivity of 250 S/cm, and density of 1.78 $g/cm^3$. Accordingly, it is clear that the film exhibits excellent mechanical characteristics, as well as electrical conductivity.

The carbon film has a carbon content of 96%, a nitrogen content of 3.0%, and a hydrogen content of 0.5% by weight.

EXAMPLE 2

A polyamic acid film was prepared in the same manner as Example 1. The thus prepared film was stretched uniaxially to 2 times original length and then the film was imidized in the same manner as Example 1. The resulting film was found to have a tensile strength of 45 $Kgf/mm^2$ and a tensile modulus of 5000 $Kgf/mm^2$. The film was carbonized in the same manner as in Example 1 to obtain a carbon film. The carbon film was found to have a tensile strength of 50 $Kgf/mm^2$, a tensile modulus of 10000 $Kgf/mm^2$, an electric conductivity of 350

S/cm and density of 1.72 g/cm³. The carbon content was 95%, a nitrogen content was 3.5%, and a hydrogen content was 0.5% by weight.

These test results show that by stretching the polyamic acid film, a carbon film having higher performance can be obtained.

Wide-angle X-ray diffraction photographs were taken by allowing X-rays to be incident upon the plane of the carbon film from the directions perpendicular to and parallel with the plane of the carbon film. A diffraction pattern from the (002) lattice appeared by strong reflection in the equatorial direction, and it became clear that the graphite layer was grown in the orientation direction of the film.

COMPARATIVE EXAMPLE 1

Commercially available polyimide film (trade name: Kapton H, manufactured by Toray Du Pont) having a tensile strength of 18 Kgf/mm² and a tensile modulus of elasticity of 300 Kgf/mm² was put between two graphite sheets and treated in a nitrogen gas atmosphere in a carbonization furnace at such a heating rate that the temperature was raised to 800° C. at a heating rate of 1.0° C./min and further raised to 1000° C. at a heating rate of 1.5° C./min and then the film was heated at 1000° C. for 90 minutes. The film was gradually cooled to room temperature to obtain a carbon film.

The carbon film taken out from the carbonization furnace had a thickness of 40 μm and metallic luster and was found to have a tensile strength of 20 Kgf/mm², a tensile modulus of elasticity of 3000 Kgf/mm², an electric conductivity of 150 S/cm, and a density of 1.68 g/cm³.

Wide-angle X-ray diffraction photographs of the carbon film were taken by allowing X-rays to be incident upon the plane of the carbon film from the directions perpendicular to and parallel with the plane of the carbon film. A diffraction pattern from the (002) lattice appeared as Debye ring, and it was found that the graphite layer was randomly grown in the film.

In the above-described commercially available polyimide film, the molecular chain which constitutes the polyimide is slightly crystalline, and the film is not highly oriented. The polyimide film has a low strength and a low modulus, and hence the resulting carbon film does not have excellent mechanical and electrical properties.

EXAMPLE 3

Pyromellitic dianhydride, p-phenylenediamine and 3,3'-dichloro-4,4'-diaminobiphenyl were subjected to an addition polymerization reaction in the same manner as Example 1 to prepare a polyamic acid solution. The monomers were used in such a proportion that 0.0108 mol of p-phenylenediamine and 0.0092 mol of 3,3'-dichloro-4,4'-diaminobiphenyl were used, each amount being based on 0.02 mol of pyromellitic dianhydride.

A polyamic acid film was prepared from said polymer solution by means of a solution casting method in the same manner as Example 1 except that the coating amount was 250 g/m². The polyamic acid film was uniaxially stretched 1.5 times, fixed to a steel frame and stepwise heat-treated at 100° C. for one hour, at 200° C. for one hour, at 300° C. for one hour and at 400° C. for one hour to obtain a polyimide film. The film was found to have a tensile strength of 30 Kgf/mm² and a tensile modulus of elasticity of 2500 Kgf/mm², and hence the film had a high strength and a high modulus of elasticity.

The polyimide film was put between two graphite sheets and treated in a nitrogen gas atmosphere in a carbonization furnace at such a heating rate that the temperature was raised to 700° C. at a heating rate of 5° C./min, and the film then was heat-treated at 700° C. for one hour. Subsequently, the temperature was raised to 1500° C. at a heating rate of 2° C./min, and the film was heat-treated at 1500° C. for 60 minutes. The film was gradually cooled to room temperature to obtain a carbon film.

The carbon film taken out from the carbonization furnace had a thickness of 20 μm and metallic luster and was found to have a tensile strength of 45 Kgf/mm², a tensile modulus of elasticity of 7500 Kgf/mm², an electric conductivity of 280 S/cm, and density of 1.70 g/cm³. The film had a carbon content of 96%, a nitrogen content of 2.0%, and a hydrogen content of 0.5% by weight. It is clear that the film has excellent mechanical characteristics as well as electrical conductivity.

The wide-angle X-ray diffraction photographs of the carbon film were taken by allowing X-rays to be incident upon the plane of the carbon film from the directions perpendicular to and parallel with the plane of the carbon film. A diffraction peak from the (002) lattice appeared by strong reflection in the equatorial direction, and it was found that the graphite layer was grown in the stretching direction of the film.

EXAMPLE 4

3,3',4,4'-Biphenyltetracarboxylic acid dianhydride and p-phenylenediamine in an equimolar ratio were subjected to a polyaddition reaction in the same manner as Example 1 except that the tetramine was not used and N,N-dimethylacetamide (DMA) was used instead of NMP, to prepare a 15 wt % polyamic acid solution (1).

Separately, pyromellitic dianhydride and p-phenylenediamine in an equimolar ratio were subjected to a polyaddition reaction in the same manner as above to prepare a 15 wt % polyamic acid solution (2).

In order to prepare a blend film from the polyamic acid solution (1) and the polyamic acid solution (2), the solution (1) and the solution (2) in an equal ratio (percent by weight) were mixed to prepare a mixed polyamic acid solution composed of the solution (1) and the solution (2).

A blend film of the polyamic acids was prepared from the mixed polymer solution in the same manner as Example 1. The polyamic acid film containing 5 wt % of the solvent was uniaxially stretched 1.5 times at room temperature, fixed to a steel frame and stepwise treated at 100° C. for one hour, at 200° C. for one hour, at 300° C. for one hour and at 400° C. for one hour to obtain a polyimide film. The polyimide film was found to have a tensile strength of 45 Kgf/mm² and, a tensile modulus of elasticity of 3500 Kgf/mm², and hence the polyimide film had a high strength and a high modulus.

The polyimide film was put between two graphite sheets and treated in a nitrogen gas atmosphere in a carbonization furnace at such a heating rate that the temperature was raised to 800° C. at a heating rate of 2° C./min and then raised to 2000° C. at a heating rate of 5° C./min, and the film was heated at 2000° C. for 60 minutes. The film was gradually cooled to room temperature to obtain a carbon film.

The carbon film removed from the carbonization furnace had a thickness of 20 μm and metallic luster and was found to have a tensile strength of 45 Kgf/mm$^2$, a tensile modulus of elasticity of 14000 Kgf/mm$^2$, an electric conductivity of 450 S/cm, and density of 1.75 g/cm$^3$. The film had a carbon content of 98%, a nitrogen content of 0.5%, and a hydrogen content of 0.2% by weight. It is clear that the film exhibited excellent mechanical characteristics as well as electrical conductivity.

The film was immersed in a nitromethane solution containing 10% by weight of FeCl$_3$ at room temperature for 24 hours to carry out doping. After doping, the film had an electric conductivity of as high as 8500 S/cm.

EXAMPLE 5

Pyromellitic dianhydride and p-phenylenediamine in an equimolar ratio were subjected to a polyaddition reaction in the same manner as Example 1 except that the tetramine was not used, to prepare a 15 wt % polyamic acid solution (3).

Separately, pyromellitic dianhydride, p-phenylenediamine and 3,3',4,4'-tetraaminobiphenyl tetrachloride were used as monomers and polymerized in the same manner as Example 1 to prepare a 15 wt % polyamic acid solution (4). The monomers of the solution (4) were used in such a proportion that 92 mol % of p-phenylenediamine and 4 mol % of 3,3',4,4'-tetraaminobiphenyl tetrachloride were used, each amount being based on 100 mol of pyromellitic dianhydride.

The solutions (3) and (4) in an equal ratio (percent by weight) were mixed, and a blend film of the polyamic acids was prepared from the mixed polyamic acid solution through a high-molecular polymer gel in the same manner as Example 1.

The film was uniaxially stretched 2.5 times at room temperature, fixed to a steel frame and stepwise heat-treated at 100° C. for one hour, at 200° C. for one hour, at 300° C. for one hour and at 400° C. for one hour to obtain a polyimide film. The film was found to have a tensile strength of 50 Kgf/mm$^2$ and a tensile modulus of elasticity of 7500 Kgf/mm$^2$, and hence had great mechanical strength and a high modulus.

The polyimide film was placed between two graphite sheets and treated in a nitrogen gas atmosphere in a carbonization furnace at such a heating rate that the temperature was raised to 800° C. at a heating rate of 1° C./min and then raised to 1500° C. at a heating rate of 2° C./min, and then heat-treated at 1500° C. for 60 minutes. The film was gradually cooled to room temperature to obtain a carbon film.

The carbon film removed from the carbonization furnace had a thickness of 40 μm and metallic luster and was found to have a tensile strength of 60 Kgf/mm$^2$, a tensile modulus of elasticity of 18000 Kgf/mm2, an electric conductivity of 800 S/cm, and a density of 1.73 g/cm$^3$. The carbon film had a carbon content of 96%, a nitrogen content of 2.5%, and a hydrogen content of 0.3% by weight.

It is clear that the film had excellent mechanical characteristics as well as electrical conductivity.

EXAMPLE 6

In a 300 ml separable flask were weighed 1.730 g (0.016 mol) of purified p-phenylenediamine (PPD) and 0.801 g (0.004 mol) of 4,4'-diaminodiphenyl ether (4,4'-DPE), and 50.6 g of distilled N,N-dimethylacetamide (DMAc) was added thereto. The mixture was stirred to dissolve them.

The temperature of an external water bath of the flask was controlled to 5° C. and while stirring the resulting solution in a nitrogen gas atmosphere, 4.366 g (0.02 mol) of purified anhydrous pyromellitic dianhydride as a solid was added thereto with care so as not to allow the temperature of the solution to be raised. After completion of the addition, stirring was continued to carry out a polyaddition reaction for 1 hour, whereby a uniform polyamic acid solution was prepared.

The polyamic acid solution was stirred at room temperature (about 20° C.) for one hour to complete the reaction. The polymer solution was cast on a glass plate. The coating amount of the solution was controlled by means of a spacer so as to give a thickness of about 0.5 mm.

The polyamic acid solution cast on the glass plate was dried at 30° C. in a vacuum to prepare a polyamic acid film. After the amount of the solvent in the film was adjusted to 5% by weight based on the total weight of the film, the film was peeled off from the glass plate and dried at 80° C. in a dryer for 60 minutes. The film was then fixed to a steel frame and dried at 120° C. for 60 minutes and then at 150° C. for 60 minutes. The steel frame was removed, and the film was dried at 200° C. for 60 minutes, again fixed to a steel frame and heat-treated at 300° C. for 60 minutes and at 400° C. for 60 minutes to obtain a uniform polyimide film.

It was found that the repeating unit (formula (V) of poly(p-phenylene-pyromellitic imide) accounted for 80% of the total repeating units of the polymer, and the film had a thickness of about 50 μm.

The polyimide film was placed between two graphite sheets and treated in a nitrogen gas atmosphere in a carbonization furnace at such a heating rate that the temperature was raised to 600° C. at a heating rate of 0.5° C./min and further raised to 1200° C. at a heating rate of 1.5° C./min, and the film then was heat-treated at 1200° C. for 90 minutes.

The film was gradually cooled to room temperature and taken out from the carbonization furnace. The resulting carbon film had a thickness of 40 μm and metallic luster. The yield was 50%.

The density of the carbon film was measured by means of a sink-float method using a mixed solvent of bromoform and ethanol. The carbon film was found to have a density of 1.77 g/cm$^3$. Further, the tensile characteristics of the carbon film were evaluated by a test piece of 5 mm in width with a distance between chucks being 30 mm. The carbon film was found to have a tensile strength of 30 Kgf/mm$^2$ and a tensile modulus of 5,500 Kgf/mm$^2$.

The carbon content of the carbon film was determined by elemental analysis. The carbon content was 95%, the nitrogen content was 3.5%, and the hydrogen contents was 0.3% by weight.

COMPARATIVE EXAMPLE 2

In a 300 ml separable flask were weighed 1.081 g (0.01 mol) of purified PPD and 2.002 g (0.01 mol) of 4,4'-DPE, and 54.6 g of distilled DMAc was added thereto. The mixture was stirred to dissolve them.

In the same manner as in Example 6, the temperature of an external water bath of the flask was controlled to 5° C. in a nitrogen gas atmosphere.

While stirring the resulting solution, 4.366 g (0.02 mol) of purified anhydrous pyromellitic dianhydride as a solid was gradually added thereto to carry out a polyaddition reaction for one hour.

The polyamic acid solution was stirred at room temperature for one hour to complete the reaction. The polymer solution was cast on a glass plate. The coating amount of the solution was controlled by means of a spacer so as to give a thickness of about 0.5 mm.

In the same manner as in Example 6, a film was prepared and dried to obtain a polyimide film. The repeating unit of formula (V) accounted for 50% of the entire repeating units of the polymer.

The film was carbonized under the same conditions as those of Example 6 to obtain a carbon film. The carbon film was found to have a density of 1.65 g/cm$^3$, a tensile strength of 30 Kgf/mm$^2$, a tensile modulus of elasticity of 4000 Kgf/mm$^2$, an electric conductivity of 180 S/cm, a carbon content of 92%, a nitrogen content of 3.5%, and a hydrogen content of 1.5% by weight.

COMPARATIVE EXAMPLE 3

In a 300 ml separable flask were weight 2.162 g (0.02 mol) of purified PPD, and 65.1 g of distilled DMAc was added thereto. The mixture was stirred to dissolve it.

In the same manner as in Example 6, the temperature of an external water bath of the flask was controlled to 5° C. in a nitrogen gas atmosphere, and while stirring the resulting solution, 5.880 g (0.02 mol) of purified biphenyltetracarboxylic acid dianhydride (BPDA) as a solid was gradually added thereto to carry out a polyaddition reaction for one hour.

The polyamic acid solution was stirred at room temperature for one hour to complete the reaction. The polymer solution was cast on a glass plate. The coating amount of the solution was controlled by means of a spacer so as to give a thickness of about 0.5 mm.

In the same manner as in Example 6 a polyimide film was obtained from the thus prepared film. The repeating unit of formula (V) accounted for 0 mol % of the whole of the polymer. The film had a tensile strength of 20 Kgf/mm$^2$ and a tensile modulus of elasticity of 500 Kgf/mm$^2$.

The film was carbonized under the same carbonization conditions as those of Example 6 to obtain a carbon film. The carbon film was found to have a density of 1 70 g/cm$^3$, a tensile strength of 25 Kgf/mm$^2$, a tensile modulus of elasticity of 4500 Kgf/mm$^2$ a carbon content of 92%, a nitrogen content of 4.0%, and a hydrogen content of 1.5% by weight.

EXAMPLE 7

In a 300 ml four-necked separable flask were weighed 1.730 g (0.016 mol) of purified PPD, and 38.3 g of distilled DMAc was added thereto. The mixture was stirred to dissolve them. The temperature of an external water bath was controlled to 5° C. in a nitrogen gas atmosphere. While stirring the resulting solution, 3.493 g (0.016 mol) of purified anhydrous pyromellitic dianhydride as a solid was added thereto with care so as not to allow the temperature of the solution to be raised, to carry out a polyaddition reaction for one hour, whereby a uniform polyamic acid solution was prepared.

Separately, 0.432 g (0.004 mol) of purified PPD was weighed in another flask, and 11.8 g of distilled DMAc was added thereto. Subsequently, in the same manner as that described above, 1.176 g (0.004 mol) of 3,3',4,4'-biphenyltetracarboxylic acid dianhydride (BPDA) was added thereto to carry out a polyaddition reaction for one hour, whereby a polyamic acid solution was prepared.

The above two polyamic acids comprising PMDA/PPD and BPDA/PPD were mixed with stirring at room temperature in a nitrogen gas atmosphere to obtain a uniform mixed polyamic acid solution.

In the same manner as in Example 6, a film was prepared, dried and heat-treated to obtain a polyimide film. The polyimide contained the repeating units of formula (V) in an amount of 80% based on the total repeating units of the polymer, and it had a tensile strength of 25 Kgf/mm$^2$ and a tensile modulus of elasticity of 800 Kgf/mm$^2$.

In the same manner as in Example 6, the film was carbonized to obtain a carbon film. The carbon film was found to have a density of 1.78 g/cm$^3$, a tensile strength of 25 Kgf/mm$^2$, a tensile modulus of elasticity of 5500 Kgf/mm$^2$ and a carbon content of 95% by weight.

EXAMPLE 8

In a 300 ml four-necked separable flask were weighed 1.989 g of purified PPD and 0.288 g of 3,3',4,4'-tetraaminobiphenyl tetrahydrochloride, and 48.7 g of distilled NMP was added thereto. The mixture was stirred to dissolve them.

The temperature of an external water bath of the flask was controlled to 0° C. in a nitrogen gas atmosphere. While stirring the resulting solution, 4.366 g of purified anhydrous pyromellitic dianhydride as a solid was gradually added thereto with care so as not to allow the temperature of the solution to be raised.

While the temperature of the polyamic acid solution was controlled to 0° C., the solution was stirred for 0.5 hours to obtain a uniform solution. The solution was cast on a glass plate. The coating amount of the solution was controlled by means of a spacer so as to give a thickness of about 0.5 mm.

The polyamic acid solution cast on the glass plate was caused to gel after a while, whereby a uniform gel film was obtained.

The polyamic acid gel film was dried in a vacuum at 45° C. for 3 hours and at 80° C. for 60 minutes to obtain a polyamic acid film containing NMP in an amount of 2.0% by weight which was then peeled off from the glass plate. Further, the film was fixed to a steel frame and dried in a dryer at 100° C. for 60 minutes and at 150° C. for 60 minutes. The film was then heat-treated at 200° C. for 60 minutes, at 300° C. for 60 minutes and at 400° C. for 60 minutes to obtain a uniform polyimide film. The polyimide film was put between two graphite plates and treated in a nitrogen gas atmosphere in a carbonization furnace at such a heating rate that the temperature was raised to 800° C. at a heating rate of 0.5° C./min and further raised to 1000° C. at a heating rate of 1.5° C./min, and the film was heated at 1000° C. for 90 minutes.

The film was gradually cooled to room temperature and taken out from the carbonization furnace. The resulting film had a thickness of about 40 μm and metallic luster. The yield was 53%.

The carbon film was found to have a density of 1.78 g/cm$^3$, a tensile strength of 30 Kgf/mm$^2$, a tensile modulus of elasticity of 6000 Kgf/mm$^2$, and an electroconductivity of 280 S/cm.

The carbon content of the carbon film was determined by elemental analysis. The carbon film was found to have a carbon content of 95%, a nitrogen content of 3.0%, and a hydrogen content of 0.6% by weight.

EXAMPLES 9 TO 11

Monomers in amounts indicated in Table 1 were charged into a 300 ml four-necked separable flask. In the same manner as in Examples 6 to 8, polyimide films were prepared.

Each polyimide film was put between two graphite plates. In the same manner as in Example 6 to 8, the film was carbonized to the final heat-treating temperature indicated in Table 1 in the carbonization furnace to obtain a carbon film. The temperature was raised to 600° C. at a heating rate of 0.5° C./min and further raised to the final heat-treating temperature at a heating rate of 1.5° C./min.

The carbon films obtained in these Examples have a high density and high-mechanical characteristics as shown in Table 1.

The abbreviation name, chemical formula and molecular weight thereof are shown in Table 2.

TABLE 1

|  | Example |  |  |  |  |  | Comparative Example |  |
|---|---|---|---|---|---|---|---|---|
|  | 6 | 7 | 8 | 9 | 10 | 11 | 2 | 3 |
| Type of monomer and amount (g) | | | | | | | | |
| Acid anhydride | | | | | | | | |
| PMDA | 4.366 | 3.493 | 4.366 | 4.366 | 4.366 | 4.366 | 4.366 | — |
| BPDA | — | 1.176 | — | — | — | — | — | 5.880 |
| Aromatic diamine | | | | | | | | |
| PPD | 1.730 | 2.162 | 1.989 | 1.730 | 1.946 | 1.838 | 1.081 | 2.162 |
| MPD | — | — | — | 0.216 | — | — | — | — |
| 4,4'-DPE | 0.801 | — | — | — | — | — | 2.002 | — |
| OTD | — | — | — | — | — | 0.425 | — | — |
| DCDH | — | — | — | — | — | 0.326 | — | — |
| Others | | | | | | | | |
| TAB | — | — | 0.288 | 0.360 | — | 0.360 | — | — |
| Polyamide-imide | — | — | — | — | — | 0.750 | — | — |
| Type of solvent for polymerization*[1] | DMAc | DMAc | NMP | NMP DMAc | NMP | DMF | DMAc | DMAc |
| Final heat-treating temp. (°C.) for forming carbon film | 1200 | 1200 | 1000 | 1800 | 2300 | 2000 | 1200 | 1200 |
| Characteristics of carbon film | | | | | | | | |
| Density (g/cm$^3$) | 1.77 | 1.78 | 1.78 | 1.80 | 1.83 | 1.80 | 1.65 | 1.70 |
| Tensile strength (Kgf/mm$^2$) | 30 | 25 | 30 | 25 | 18 | 25 | 30 | 25 |
| Tensile modulus of elasticity (Kgf/mm$^2$) | 5500 | 5500 | 6000 | 6000 | 5800 | 5700 | 4000 | 4500 |
| Carbon content (wt %) | 95 | 95 | 95 | 96 | 97 | 95 | 92 | 92 |
| Nitrogen content (wt %) | 3.5 | 3.2 | 3.0 | 2.4 | 1.8 | 2.0 | 3.5 | 4.0 |
| Hydrogen content (wt %) | 0.3 | 0.6 | 0.6 | 0.4 | 0.6 | 0.8 | 1.5 | 1.5 |
| Electric conductivity | 250 | 270 | 280 | 380 | 550 | 420 | 180 | 190 |

*[1]: Type of solvent for polymerization
DMAc: N,N-dimethylacetamide
NMP: N-methyl-2-pyrrolidone
DMF: N,N-dimethylformamide
Numerals for amounts in Table represent weight (g).

TABLE 2

| Classification | Abbreviation | Name | Chemical formula | Mol. wt. |
|---|---|---|---|---|
| Tetracarboxylic acid anhydride | PMDA | Pyromellitic dianhydride | (structure) | 218 |
| | BPDA | 3,3',4,4'-biphenyltetra-carboxylic acid dianhydride | (structure) | 294 |
| Aromatic diamine | PPD | p-phenylenediamine | $H_2N$—(ring)—$NH_2$ | 108 |

TABLE 2-continued

| Classification | Abbreviation | Name | Chemical formula | Mol. wt. |
|---|---|---|---|---|
|  | MPD | m-phenylenediamine | 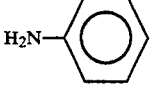 | 108 |
|  | 4,4'-DPE | 4,4'-diaminodiphenyl ether | 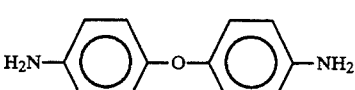 | 200 |
|  | OTD | o-toluidine (3,3'-dimethyl-4,4'-diaminobiphenyl) |  | 212 |
|  | DCDH | 3,3'-dichloro-4,4'-diaminobiphenyl dihydrochloride |  | 326 |
| Others | TAB | 3,3',4,4'-tetraamino-biphenyl tetrahydrochloride | 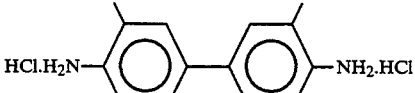 | 360 |
|  |  | polyamide-imide (Thorone (trade name) manufactured by Mitsubishi Kasei Corp.) | 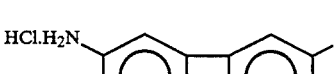 | — |

What is claimed is:

1. A process for preparing a carbon film which comprises the following steps:
    (1) reacting a monomer combination selected from the group consisting of: (a) a combination comprising a tetracarboxylic acid dianhydride and an aromatic diamine; and, (b) a combination comprising a tetracarboxylic acid dianhydride, an aromatic diamine, and a polyamino compound having at least three amino groups, to form a polyamic acid;
    (2) forming a film of said polyamic acid;
    (3) imidizing the polyamic acid film by carrying out a dehydration-cyclization reaction to form a polyimide film having a tensile strength of at least 10 Kgf/mm² and a tensile modulus of elasticity of at least 500 Kgf/mm²; and
    (4) carbonizing the polyimide film in an inert gas or in a vacuum until a carbon film having a tensile strength of at least 15 Kgf/mm², a tensile modulus of elasticity of at least 5000 Kgf/mm² and an electric conductivity of at least 200 S/cm is formed.

2. The process for preparing a carbon film as claimed in claim 1, wherein the polyimide film further comprises a polymer.

3. The process for preparing a carbon film as claimed in claim 1, wherein the polyimide film is stretched after imidization or said polyamic acid film is stretched.

4. The process for preparing a carbon film as claimed in claim 1, wherein said polyimide film is preheated in an inert gas or in a vacuum at a temperature of 500° to 800° C. prior to carbonization, and then carbonized by heating in an inert gas or in a vacuum at a temperature of at least 1000° C.

5. The process for preparing a carbon film as claimed in claim 1, wherein said tetracarboxylic acid dianhydride is selected from the group consisting of a tetracarboxy benzene dianhydride, a tetracarboxy dianhydride of a compound having 2 to 5 condensed benzene rings, and compounds represented by formula (I), and substituted compounds thereof;

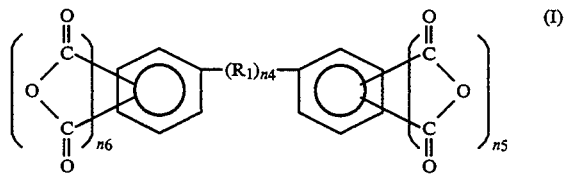

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group; $n_4$ is 0 or 1; $n_5$ is 0 or 1; and $n_6$ is 1 or 2, provided that the sum of $n_5$ and $n_6$ is 2.

6. The process for preparing a carbon film as claimed in claim 1, wherein said aromatic diamine is selected from the group consisting of a phenylene diamine, a diamino pyridine, a diamino compound having 2 to 8 condensed benzene rings, compounds represented by formula (II) and substituted compounds thereof:

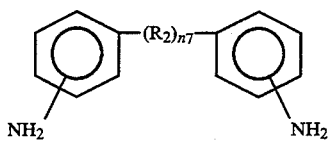

(II)

wherein R₂ represents —O—, —CO—, —SO₂—, —SO—, a phenylene group, an alkylene group, a phenylene alkylene group, a phenylene dialkylene group, or

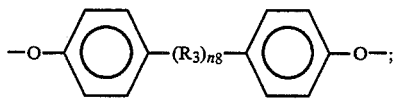

$n_7$ is 0 or 1; R₃ represents —O—, —CO—, —SO₂—, —SO—, a phenylene group, an alkylene group, or a phenylene alkylene group, or a phenylene dialkylene group; and $n_8$ is 0 or 1.

7. The process for preparing a carbon film as claimed in claim 2, wherein said polyamino compound is selected from the group consisting of compounds represented by formula (III) or (IV):

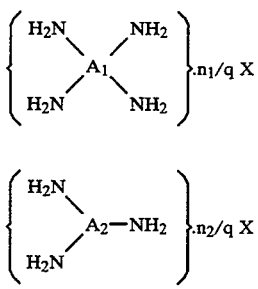

wherein A₁ represents

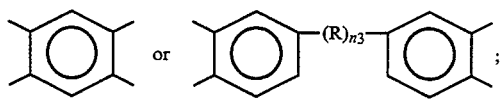

A₂ represents

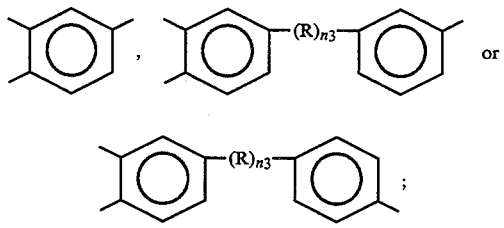

$n_1$ is 0 or an integer from 1 to 4; $n_2$ is 0 or an integer from 1 to 3; X represents an acid; q is the base number of the acid; R represents —O—, —CH₂—, —CO— or —SO₂—; and $n_3$ is 0 or 1.

8. The process for preparing a carbon film as claimed in claim 1, wherein the molar ratio of said tetracarboxylic acid dianhydride to said aromatic diamine to said polyamino compound is from 100:60–100:0–20.

9. The process for preparing a carbon film as claimed in claim 1, wherein the molar ratio of said tetracarboxylic acid dianhydride to said aromatic diamine to said polyamino compound is from 100:60–100:1–20.

10. The process for preparing a carbon film as claimed in claim 1, wherein said polyamic acid has a molecular weight of from 10,000 to 300,000.

11. The process for preparing a carbon film as claimed in claim 1, wherein said tetracarboxylic acid dianhydride is selected from the group consisting of pyromellitic dianhydride, 3,3',4,4'-benzophenonetetracarboxylic acid dianhydride, 3,3',4,4'-biphenyltetracarboxylic acid dianhydride, 2,3,3',4'-biphenyltetracarboxylic acid dianhydride, 2,2',3,3'-biphenyltetracarboxylic acid dianhydride, 2,2',6,6'-biphenyltetracarboxylic acid dianhydride, 2,3,6,7-naphthalenetetracarboxylic acid dianhydride, 1,2,5,6-naphthalenetetracarboxylic acid dianhydride, 2,2-bis(3,4-dicarboxyphenyl)propane dianhydride, bis(3,4-dicarboxyphenyl)sulfone dianhydride, bis(3,4-dicarboxyphenyl)ether dianhydride, 3,4,9,10-perylenetetracarboxylic acid dianhydride, naphthalene-1,2,4,5-tetracarboxylic acid dianhydride, naphthalene-1,4,5,8-tetracarboxylic acid dianhydride, benzene-1,2,3,4-tetracarboxylic acid dianhydride, ethylene glycol bis(anhydrotrimellitate), and mixtures thereof.

12. The process for preparing a carbon film as claimed in claim 1, wherein said aromatic diamine is selected from the group consisting of p-phenylenediamine, m-phenylenediamine, benzidine, o-toluidine, 4,4'-diaminodiphenylpropane, 3,3'-diaminodiphenylmethane, 4,4'-diaminodiphenyl sulfide, 4,4'-diaminodiphenyl sulfone, 3,3'-diaminodiphenyl sulfone, 3,4'-diaminodiphenyl sulfone, 4,4'-diaminodiphenyl ether, 3,3'-diaminodiphenyl ether, 3,4'-diaminodiphenyl ether, 4,4'-diaminobenzophenone, 3,3'-diaminobenzophenone, 2,2'-bis(4-aminophenyl)propane, 3,3'-diaminobiphenyl, 2,6-diaminopyridine, 2,5-diaminopyridine, 3,4-diaminopyridine, bis(4-(4-aminophenoxy)phenyl)sulfone, bis(4-(3-aminophenoxy)phenyl)sulfone, bis(4-(4-aminophenoxy)phenyl)ether, bis(4-(3-aminophenoxy)phenyl)ether, 2,2'-bis(4-(4-aminophenoxy)phenyl)propane, 2,2'-bis(4-(3-aminophenoxy)phenyl)propane, 4,4'-bis(4-aminophenoxy)biphenyl, 1,4-bis(4-aminophenoxy)benzene, 1,3-bis(4-aminophenoxy)benzene, 2,2'-bis(4-(3-aminophenoxy)phenyl)hexafluoropropane, 1,5-diaminonaphthalene, 2,6-diaminonaphthalene, derivatives thereof, and mixtures thereof.

13. The process for preparing a carbon film as claimed in claim 1, wherein said polyamino compound is selected from the group consisting of 3,3',4,4'-tetraaminodiphenyl ether, 3,3',4,4'-tetraaminodiphenylmethane, 3,3',4,4'-tetraaminobenzophenone, 3,3',4,4'-tetraaminodiphenyl sulfone, 3,3',4,4'-tetraaminobiphenyl, 1,2,4,5-tetraaminobenzene, 3,3',4-triaminodiphenyl, 3,3',4-triaminodiphenylmethane, 3,3',4-triaminobenzophenone, 3,3',4-triaminodiphenylsulfone, 3,3',4-triaminobiphenyl, 1,2,4-triaminobenzene, 3,3',4,4'-tetraaminodiphenyl ether tetrahydrochloride, 3,3',4,4'-tetraaminodiphenylmethane tetrahydrochloride, 3,3',4,4'-tetraaminobenzophenone tetrahydrochloride, 3,3',4,4'-tetraaminodiphenyl sulfone tetrahydrochloride, 3,3',4,4'-tetraaminobiphenyl tetrahydrochloride, 1,2,4,5-tetraaminobenzene tetrahydrochloride, 3,3',4-triaminodiphenyl trihydrochloride, 3,3',4-triaminodiphenylmethane trihydrochloride, 3,3',4-triaminobenzophenone trihydrochloride, 3,3',4-triaminodiphenylsulfone trihydrochloride, 3,3',4-triaminobiphenyl trihydrochloride, 1,2,4-triaminobenzene dihydrochloride, and a mixture thereof.

14. The process for preparing a carbon film as claimed in claim 1, wherein said polyimide comprises at least 80% based on the entire repeating units of the polymer of repeating units of poly(p-phenylene-pyromellitic imide), which is represented by the following general formula (V)

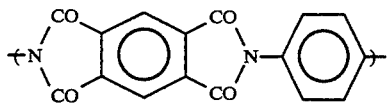

15. The process for preparing a carbon film as claimed in claim 14, wherein said polyimide is obtained from a polyamic acid obtained from pyromellitic acid dianhydride, p-phenylenediamine and 3,3',4,4'-tetraaminobiphenyl tetrahydrochloride; and the polyamic acid film is obtained by forming a gel film of the polyamic acid on a support.

16. The process for preparing a carbon film as claimed in claim 1, wherein said combination comprises the polyamino compound and the polyamic acid film is formed by using a polyamic acid solution containing an organic solvent in an amount of from 50 to 97% by weight based on the total weight of the polyamic acid solution.

17. The process for preparing a carbon film as claimed in claim 16, wherein said polyamic acid solution is gelled after formation of the polyamic acid film.

18. The process for preparing a carbon film as claimed in claim 1, wherein said imidation is conducted by dehydrating and cyclizing the polyamic acid.

19. The process for preparing a carbon film as claimed in claim 1, wherein said polyamino compounds are selected from the group of addition salts consisting of 1,2,4,5-tetraaminobenzene, 3,3',4-triaminobiphenyl, 3,3',4-triaminodiphenylmethane, 3,3',4-triaminobenzophenone, 3,3',4-triaminodiphenylsulfone, 3,3',4-triaminobiphenyl, 1,2,4-triaminobenzene, 3,3',4,4'-tetraaminodiphenyl ether tetrahydrochloride, 3,3',4,4'-tetraaminodiphenylmethane tetrahydrochloride, 3,3',4,4'-tetraaminobenzophenone tetrahydrochloride, 3,3',4,4'-tetraaminodiphenyl sulfone tetrahydrochloride, 3,3',4,4'-tetraaminobiphenyl tetrahydrochloride, 1,2,4,5-tetraaminobenzene tetrahydrochloride, 3,3',4-triaminodiphenylmethane trihydrochloride, 3,3',4-triaminobenzophenone trihydrochloride, 3,3',4-triaminodiphenylsulfone trihydrochloride, 3,3',4-triaminobiphenyl trihydrochloride, 1,2,4-triaminobenzene dihydrochloride, and a mixture thereof.

20. The process for preparing a carbon film as claimed in claim 19, wherein said salts are incorporated into said polyamic acid in an amount of 75 to 100 mol %, based on the total moles of polyamino compound (C).

21. The process for preparing a carbon film as claimed in claim 1, wherein a carbonization catalyst is dispersed in the polyimide film, said catalyst being selected from the group consisting of ferrous chloride, nickel, chloride, and cobalt chloride.

22. The process for preparing a carbon film as claimed in claim 1, wherein said carbon film is at least 85% carbon.

23. The process for preparing a carbon film as claimed in claim 1, wherein said carbon film is at least 95% carbon.

24. The process for preparing a carbon film as claimed in claim 2, wherein the polymer is selected from the group consisting of a polyamic acid which is prepared from a monomer combination comprising a tetracarboxylic acid dianhydride and an aromatic diamine, but which combination is a different combination thereof, or proportion thereof, from that of the polyamic acid prepared in step (1), a polyamic acid which is prepared from a monomer combination comprising a tetracarboxylic acid dianhydride, an aromatic diamine, and a polyamino compound having at least 3 amino groups, but which combination is a different combination thereof, or proportion thereof, from that of the polyamic acid prepared in step (1), polyimides obtained from monomer components different from those of the polyimide formed in steps (1), (2), and (3), polyamideimides, polyetherimides, polybenzimidazole, polybenzoxazole, polybenzthiazole, aromatic polyamides and polyacrylonitrile.

* * * * *